US009088749B2

(12) United States Patent
Li

(10) Patent No.: US 9,088,749 B2
(45) Date of Patent: Jul. 21, 2015

(54) METHOD, APPARATUS AND SYSTEM FOR MOBILE TERMINAL TO REMOTELY CONTROL TELEVISION

(71) Applicant: Huawei Technologies Co., Ltd., Shenzhen, Guangdong (CN)

(72) Inventor: Guozhu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/797,783

(22) Filed: Mar. 12, 2013

(65) Prior Publication Data

US 2013/0258206 A1  Oct. 3, 2013

(30) Foreign Application Priority Data

Mar. 21, 2012  (CN) .......................... 2012 1 0075656

(51) Int. Cl.
*H04N 5/44* (2011.01)
*H04N 21/41* (2011.01)
*H04N 21/422* (2011.01)

(52) U.S. Cl.
CPC ......... *H04N 5/4403* (2013.01); *H04N 21/4126* (2013.01); *H04N 21/42209* (2013.01); *H04N 21/42226* (2013.01); *H04N 2005/441* (2013.01); *H04N 2005/4407* (2013.01); *H04N 2005/4435* (2013.01)

(58) Field of Classification Search
CPC .................................................... H04N 5/4403
USPC ............................................ 348/734; 725/37
See application file for complete search history.

(56) References Cited

U.S. PATENT DOCUMENTS

| | | | |
|---|---|---|---|
| 6,097,441 A * | 8/2000 | Allport | 348/552 |
| 2007/0130607 A1* | 6/2007 | Thissen et al. | 725/132 |
| 2009/0138910 A1* | 5/2009 | Jin et al. | 725/38 |
| 2009/0298535 A1* | 12/2009 | Klein et al. | 455/556.1 |
| 2010/0219976 A1* | 9/2010 | Park et al. | 340/825.22 |
| 2010/0245680 A1* | 9/2010 | Tsukada et al. | 348/734 |

(Continued)

FOREIGN PATENT DOCUMENTS

| | | |
|---|---|---|
| CN | 101135969 A | 3/2008 |
| CN | 101841637 A | 9/2010 |

(Continued)

*Primary Examiner* — Jefferey Harold
*Assistant Examiner* — Humam Satti
(74) *Attorney, Agent, or Firm* — Leydig, Voit & Mayer, Ltd.

(57) ABSTRACT

The present invention discloses a method, an apparatus and a system for a mobile terminal to remotely control a television. The method includes: obtaining widget coding information of a widget included in a current GUI of a television; sending a graph reproduction control command to a mobile terminal wirelessly connected to the television, where the graph reproduction control command includes the widget coding information used for instructing the mobile terminal to generate a control interface including a widget corresponding to the widget coding information; receiving input event information sent by the mobile terminal, where the input event information includes operation object information and operation instruction information that are captured by the mobile terminal in the control interface; and determining a target widget in the current GUI of the television according to the operation object information, and performing an operation corresponding to the operation instruction information on the target widget.

20 Claims, 2 Drawing Sheets

(56) References Cited

U.S. PATENT DOCUMENTS

| | | | |
|---|---|---|---|
| 2010/0317332 A1* | 12/2010 | Bathiche et al. | 455/418 |
| 2010/0325203 A1* | 12/2010 | Park et al. | 709/203 |
| 2011/0009166 A1* | 1/2011 | Noh et al. | 455/557 |
| 2011/0061078 A1* | 3/2011 | Rothschild | 725/51 |
| 2011/0086631 A1* | 4/2011 | Park et al. | 455/419 |
| 2011/0114716 A1* | 5/2011 | Pratt | 235/375 |
| 2011/0154228 A1* | 6/2011 | Kinoshita | 715/763 |
| 2011/0231872 A1* | 9/2011 | Gharachorloo et al. | 725/28 |
| 2011/0310298 A1* | 12/2011 | Berestov et al. | 348/563 |
| 2012/0026409 A1* | 2/2012 | Higuchi et al. | 348/734 |
| 2012/0079533 A1* | 3/2012 | Wong et al. | 725/37 |
| 2012/0081615 A1* | 4/2012 | Starr et al. | 348/734 |
| 2012/0140117 A1* | 6/2012 | Waites | 348/563 |
| 2012/0260292 A1* | 10/2012 | Okami | 725/51 |
| 2013/0152135 A1* | 6/2013 | Hong et al. | 725/51 |
| 2013/0159565 A1* | 6/2013 | Soyannwo et al. | 710/33 |
| 2013/0212629 A1* | 8/2013 | Chien et al. | 725/61 |
| 2013/0290901 A1* | 10/2013 | Yarita et al. | 715/810 |

FOREIGN PATENT DOCUMENTS

| | | |
|---|---|---|
| CN | 101882024 A | 11/2010 |
| WO | WO 2010098591 A2 | 9/2010 |

\* cited by examiner

METHOD, APPARATUS AND SYSTEM FOR MOBILE TERMINAL TO REMOTELY CONTROL TELEVISION

CROSS-REFERENCE TO RELATED APPLICATIONS

This application claims priority to Chinese Patent Application No. 201210075656.0, filed on Mar. 21, 2012, which is hereby incorporated by reference in its entirety.

FIELD OF THE INVENTION

Embodiments of the present invention relate to communications technologies, and in particular, to a method, an apparatus and a system for a mobile terminal to remotely control a television.

BACKGROUND OF THE INVENTION

Currently, cell phones are very widely used. If a television can be remotely controlled through a cell phone, it may become very convenient for a user to use. The prior art enables communication between a cell phone and a set top box of a television. The set top box sends, to the cell phone, program information of an electronic program guide (Electronic Program Guide, EPG for short) sent by a radio broadcast network. The user browses the program information through a screen of the cell phone, selects a favorite program from the program information, and sends a selection result to the set top box through the cell phone. The set top box switches to a corresponding frequency point according to the selection result, descrambles and decodes a program at the frequency point, and outputs the content of the program to the television, so as to display the content of the program through the television.

However, the prior art can only implement long-distance control of the program information about the EPG between the cell phone and the television. As the television implements increasingly diverse functions, for example, some televisions may implement functions of applications such as web page access through a browser, television menus, and television games, and because these applications correspond to complex graphic television interfaces and involve a large amount of data, these graphic television interfaces cannot be operated and controlled by the cell phone by using the prior art.

SUMMARY OF THE INVENTION

Embodiments of the present invention provide a method, an apparatus and a system for a mobile terminal to remotely control a television, which are used for a mobile terminal to remotely control a television with a low cost.

An embodiment of the present invention provides a method for a mobile terminal to remotely control a television, which includes:

obtaining widget coding information of a widget included in a current GUI of a television;

sending a graph reproduction control command to a mobile terminal wirelessly connected to the television, where the graph reproduction control command includes the widget coding information used for instructing the mobile terminal to generate a control interface including a widget corresponding to the widget coding information;

receiving input event information sent by the mobile terminal, where the input event information includes operation object information and operation instruction information that are captured by the mobile terminal in the control interface; and determining a target widget in the current GUI of the television according to the operation object information, and performing, on the target widget, an operation corresponding to the operation instruction information.

An embodiment of the present invention also provides another method for a mobile terminal to remotely control a television, which includes:

receiving a graph reproduction control command sent by a television wirelessly connected to a mobile terminal, where the graph reproduction control command includes widget coding information of a widget included in a current GUI of the television;

according to an API interface function used for widget management in a local GUI system of the mobile terminal, generating a control interface including a widget corresponding to the widget coding information; and when an input event for the control interface is captured, sending, to the television, corresponding input event information used for instructing the television to perform, on the current GUI of the television, processing corresponding to the input event information, where the input event information includes operation object information and operation instruction information.

An embodiment of the present invention also provides an apparatus for a mobile terminal to remotely control a television, which includes:

a widget coding information obtaining module, configured to obtain widget coding information of a widget included in a current GUI of a television;

a reproduction control command sending module, configured to send a graph reproduction control command to a mobile terminal wirelessly connected to the television, where the graph reproduction control command includes the widget coding information used for instructing the mobile terminal to generate a control interface including a widget corresponding to the widget coding information;

an input event information receiving module, configured to receive input event information sent by the mobile terminal, where the input event information includes operation object information and operation instruction information that are captured by the mobile terminal in the control interface; and a control module, configured to determine a target widget in the current GUI of the television according to the operation object information and perform, on the target widget, an operation corresponding to the operation instruction information.

An embodiment of the present invention also provides another apparatus for a mobile terminal to remotely control a television, which includes:

a graph reproduction control command receiving module, configured to receive a graph reproduction control command sent by a television wirelessly connected to a mobile terminal, where the graph reproduction control command includes widget coding information of a widget included in a current GUI of the television;

a control interface generating module, configured to generate, according to an API interface function used for widget management in a local GUI system of the mobile terminal, a control interface including a widget corresponding to the widget coding information; and an input event sending module, configured to: when an input event for the control interface is captured, send, to the television, corresponding input event information used for instructing the television to perform, on the current GUI of the television, processing corresponding to the input event information, where the input event information includes operation object information and operation instruction information.

An embodiment of the present invention also provides a system for a mobile terminal to remotely control a television, which includes:

a television, a mobile terminal, a first apparatus for a mobile terminal to remotely control a television and a second apparatus for a mobile terminal to remotely control a television, where the first apparatus for a mobile terminal to remotely control a television is one apparatus for a mobile terminal to remotely control a television, in which the apparatus is described above, and is arranged by integrating with the television, or is arranged separated from the television and is connected to the television; and the second apparatus for a mobile terminal to remotely control a television is another apparatus for a mobile terminal to remotely control a television, in which the apparatus is described above, and is wirelessly connected to the first apparatus for a mobile terminal to remotely control a television and is arranged by integrating with the mobile terminal, or is arranged separated from the mobile terminal and is connected to the mobile terminal.

In the above technical solutions provided by the embodiments of the present invention, by establishing a wireless connection between the television and the mobile terminal, the widget coding information of the widget included in the current GUI of the television is sent to the mobile terminal, so as to reproduce, on the mobile terminal, the control interface including the corresponding widget. The input event information captured by the mobile terminal in the control interface is obtained. Based on the input event information, the controlling and corresponding operation is performed on a corresponding target of the current GUI of the television, thereby implementing long-distance control of the television by the mobile terminal. The television only sends the widget coding information of the widget included in the current GUI of the television to the mobile terminal. Therefore, on one hand, the amount of data transferred between the television and the mobile terminal is reduced, thereby saving bandwidth; on the other hand, the difficulty of reproducing the current GUI of the television by the mobile terminal is simplified, and long-distance control of a complex television GUI implemented by the mobile terminal may be supported, thereby implementing the long-distance control of the television by the mobile terminal with a low cost.

BRIEF DESCRIPTION OF THE DRAWINGS

To illustrate the technical solutions in the embodiments of the present invention or in the prior art more clearly, the accompanying drawings needed for describing the embodiments or the prior art are briefly introduced in the following. Apparently, the accompanying drawings in the following description merely show some embodiments of the present invention, and persons skilled in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons skilled in the art based on the embodiments of the present invention without creative efforts shall fall within the protection scope of the present invention.

The sequence numbers of the following embodiments of the present invention are merely for description, and do not imply the preference among the embodiments.

Figure 1:
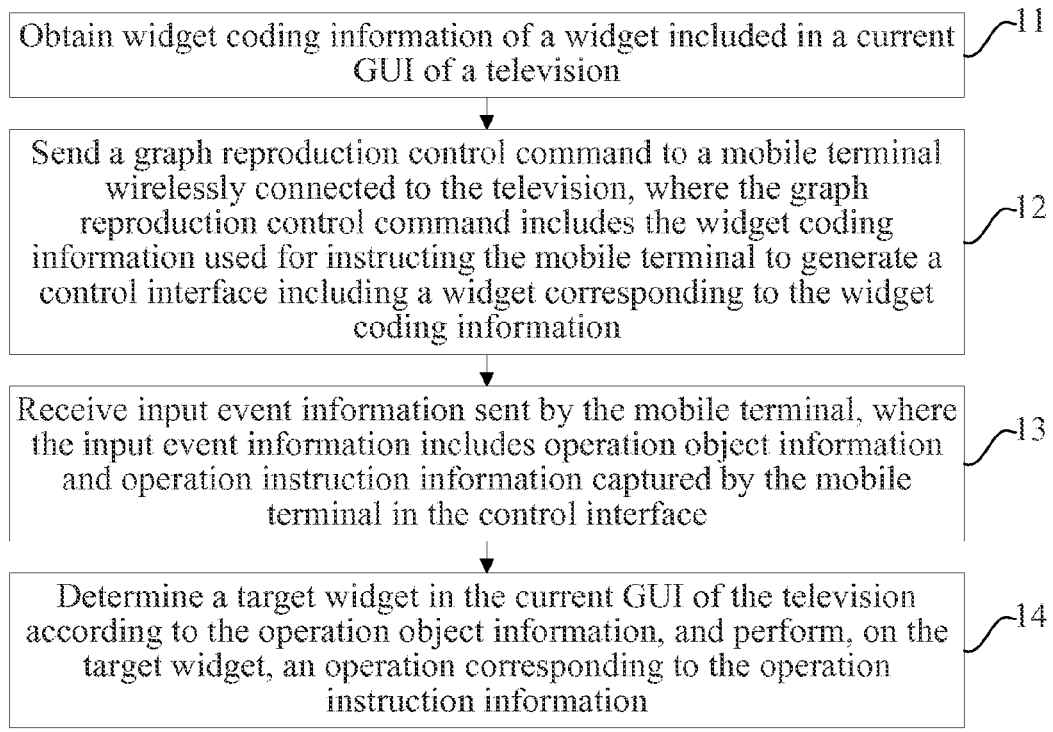
FIG. 1 is a flow chart of a method for a mobile terminal to remotely control a television provided by Embodiment 1 of the present invention.

FIG. 1 is a flow chart of a method for a mobile terminal to remotely control a television provided by Embodiment 1 of the present invention. The method shown in FIG. 1 includes the following steps:

11: Obtain widget coding information of a widget included in a current graphic user interface (Graphic User Interface, GUI for short) of a television.

When a GUI program of the television displays the GUI on the television, the current GUI of the television may be parsed, so as to determine one or more widgets included in the current GUI of the television and obtain the widget coding information of the widgets. A widget may include, but is not limited to, a button, a text box, a radio box, and a check box. The widget coding information of the widget may include, but is not limited to, information such as a type of the widget, information about the position of the widget in the current GUI of the television, and a size and a shape of the widget. The widget is an interactive element of the current GUI of the television. Apart from the widget, the current GUI of the television may also include other elements, such as pictures, backgrounds, and characters. These elements are not used for performing operation and control, so that these elements may not be sent to a mobile terminal, thereby reducing the amount of data transferred between the television and the mobile terminal. In actual application, to improve the display effect, graph drawing coding information of the current GUI of the television may also be obtained, so that the mobile terminal can draw a corresponding graph in a control interface according to the graph drawing coding information, thereby improving the display effect of the mobile terminal.

12: Send a graph reproduction control command to a mobile terminal wirelessly connected to the television, where the graph reproduction control command includes the widget coding information used for instructing the mobile terminal to generate a control interface including a widget corresponding to the widget coding information.

A wireless connection is established between the television and the mobile terminal in advance, and a specific manner of the wireless connection is not limited. For example, the wireless connection between the television and the mobile terminal may be established based on Bluetooth and WIN.

In a process of establishing the wireless connection between the television and the mobile terminal, an input device and a display capability of the mobile terminal may be negotiated. For example, a coordinate transformation relationship and an operation instruction coding correspondence between the television and the terminal, and/or a control interface resolution are negotiated, where the control interface is a mobile terminal GUI, which is on the mobile terminal and used for reproducing the current GUI of the television.

In the embodiment of the present invention, the television generally refers to a display apparatus with a big screen, such as a smart television having a built-in set top box or an ordinary television having an external set top box, and the mobile terminal may be, for example, a smart phone or an IPAD.

13: Receive input event information sent by the mobile terminal, where the input event information includes operation object information and operation instruction information that are captured by the mobile terminal in the control interface.

According to an application programming interface (API interface function for short) used for widget management in a local GUI system, the mobile terminal generates the control interface including the widget corresponding to the widget coding information.

An event is an operation that may be identified by a widget, for example, an operation of pressing an OK button, selecting a certain radio button or check box. Every widget corresponds to an event that can be identified by the widget, for example, events like loading of a form, clicks, and double clicks, and changes of the text of a text box. In the embodiment of the present invention, an input event refers to an operation that is performed in the control interface and may be identified by the widget.

When a user stimulates an operation related to an event in the control interface, the control interface captures relevant information of the current input event, that is, the input event information in the embodiment of the present invention, and sends the relevant information of the current input event to the television side.

14: Determine a target widget in the current GUI of the television according to the operation object information, and perform, on the target widget, an operation corresponding to the operation instruction information.

The input event information may include the operation object information and the operation instruction information, where the operation object information is used for determining a target widget to which the input event is oriented and the operation instruction information is used for representing the content of a specific operation performed on the target widget. The target widget can be determined in the current GUI of the television according to the operation object information. The operation instruction information may be converted into television operation instruction information that can be identified by the television, and a corresponding operation can be performed on the target widget according to a television operation instruction.

In the method provided by this embodiment, by establishing a wireless connection between the television and the mobile terminal, the widget coding information of the widget included in the current GUI of the television is sent to the mobile terminal, so as to reproduce, on the mobile terminal, the control interface including the corresponding widget. The input event information captured by the mobile terminal in the control interface is obtained. Based on the input event information, the controlling and corresponding operation is performed on a corresponding target of the current GUI of the television, thereby implementing long-distance control of the television by the mobile terminal. The television only sends the widget coding information of the widget included in the current GUI of the television to the mobile terminal. Therefore, on one hand, the amount of data transferred between the television and the mobile terminal is reduced, thereby saving the; on the other hand, the difficulty of reproducing the current GUI of the television by the mobile terminal is simplified, and long-distance control of a complex television GUI implemented by the mobile terminal may be supported, thereby implementing the long-distance control of the television by the mobile terminal with a low cost.

Figure 2:
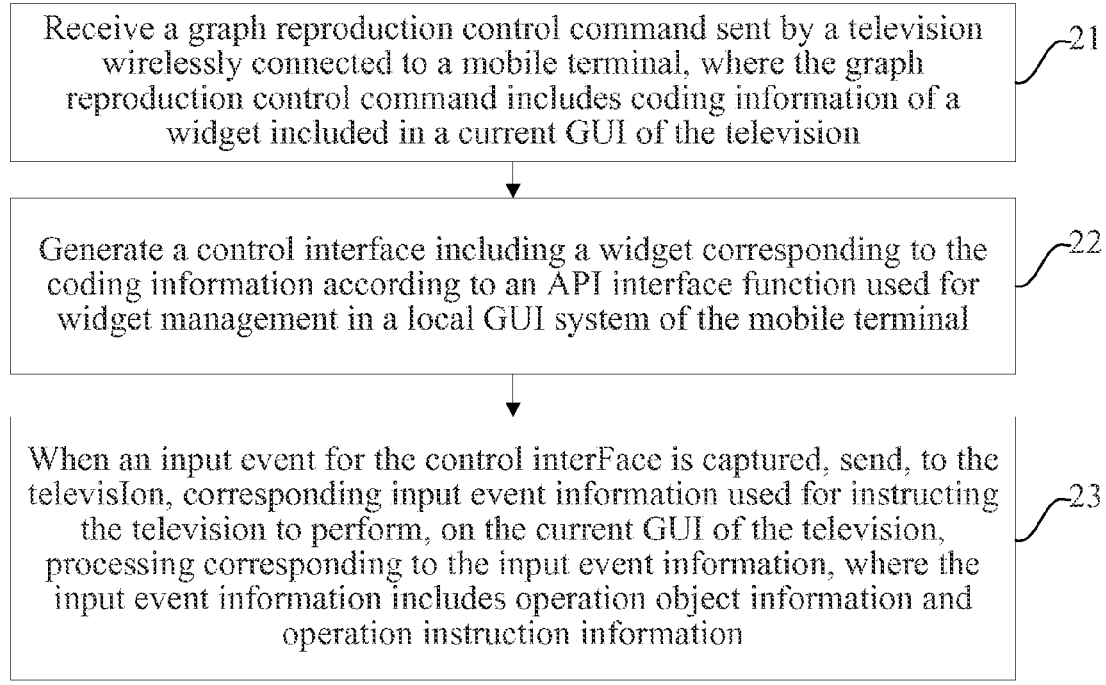
FIG. 2 is a flow chart of a method for a mobile terminal to remotely control a television provided by Embodiment 2 of the present invention.

FIG. 2 is a flow chart of a method for a mobile terminal to remotely control a television provided by Embodiment 2 of the present invention. The method shown in FIG. 2 includes the following steps:

21: Receive a graph reproduction control command sent by a television wirelessly connected to a mobile terminal, where the graph reproduction control command includes widget coding information of a widget included in a current GUI of the television.

The graph reproduction control command is used for instructing the mobile terminal to generate a control interface including a widget corresponding to the widget coding information. The widget may include, but is not limited to, a button, a text box, a radio box, and a check box. The widget coding information of the widget may include, but is not limited to, information such as a type of the widget, information about the position of the widget in the current GUI of the television, and a size and a shape of the widget.

22: According to an API interface function used for widget management in a local GUI system of the mobile terminal, generate the control interface including the widget corresponding to the widget coding information.

In the local GUI system of the mobile terminal, an API interface function corresponding to the type of the widget is determined, and other information such as the information about the position of the widget, and the size and the shape of the widget is used as input parameters of the API interface function. Subsequently, the API interface function is executed to obtain a mobile terminal GUI interface including the widget, that is, the control interface described in the embodiment of the present invention. If the graph reproduction control command includes widget coding information of multiple widgets, a corresponding widget may be generated according to widget coding information of each widget, thereby obtaining a control interface including these widgets.

23: When an input event for the control interface is captured, send, to the television, corresponding input event information used for instructing the television to perform, on the current GUI of the television, processing corresponding to the input event information, where the input event information includes operation object information and operation instruction information.

When a user stimulates an operation related to an event in the control interface, the control interface captures relevant information of the current input event, that is, the input event information in the embodiment of the present invention, and sends the relevant information of the current input (went to the television side. The input event information may include the operation object information and the operation instruction information, where the operation object information is used for determining a target widget to which the input event is oriented and the operation instruction information is used for representing the content of a specific operation performed on the target widget.

In the method provided by this embodiment, by establishing a wireless connection between the television and the mobile terminal, the mobile terminal receives the widget coding information of the widget included in the current GUI of the television, and reproduces the control interface including the corresponding widget by using the local GUI system of the mobile terminal. When the user triggers an input event in the control interface, the mobile terminal may send the input event information to the television, so that the television correspondingly processes the current GUI of the television based on the input event information. Therefore, long-distance control of a complex television GUI implemented by the mobile terminal may be supported, thereby implementing long-distance control of the television by the mobile terminal with a low cost.

Based on the above technical solution, alternatively, the mobile terminal may remotely control the television based on a touch screen of the mobile terminal. In this situation, the input event information is screen touch input event information, the operation object information is coordinate information related to a touch operation, and the operation instruction information is touch operation instruction information. When capturing a screen touch input event for the control interface, the mobile terminal sends corresponding screen touch input event information to the television. The screen touch input event information includes the coordinate information related to a touch operation, and the touch operation instruction information. According to a coordinate transformation relationship negotiated by the television and the mobile terminal in a process of establishing the wireless connection, the television performs coordinate transformation on the coordinate information related to a touch operation and determines, according to a coordinate transformation result, a target widget in the widgets included in the current GUI of the television. According to an operation instruction coding correspondence, the television determines television operation instruction information corresponding to the touch operation instruction information, and performs, on the target widget, an operation corresponding to the television operation instruction information. In the technical solution, a touch control function of the mobile terminal may be multiplexed. Based on the visual control interface reproduced by the mobile terminal, a remote operation may be performed on the complex GUI interface of the television. The operation method is simple, and flexibility of interaction between the mobile terminal and the television is improved.

Further, alternatively, in the embodiment of the present invention, the television is remotely controlled based on the visual control interface generated by the mobile terminal. Therefore, in the remote control process, the user may use an input method of the mobile terminal to input a corresponding event into a widget, for example, a text box, in the control interface, thereby multiplexing the input method of the mobile terminal in the control process of the television, which helps to reduce the complexity of the operation and improves usage convenience of the user.

It should be noted that, for brevity, the foregoing method embodiments are represented as a series of actions. But persons skilled in the art should understand that the present invention is not limited to the order of the described actions, because according to the present invention, some steps may adopt other orders or occur simultaneously. It may be understood by persons skilled in the art that the described embodiments all belong to exemplary embodiments, and the involved actions and modules are not necessarily needed by the present invention.

In the foregoing embodiments, the description of each of the embodiments has respective focuses. For a part that is not described in detail in a certain embodiment, reference may be made to related descriptions in other embodiments.

Persons skilled in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (Read-Only Memory, ROM), a Random Access Memory (Random Access Memory, RAM), a magnetic disk, or an optical disk.

If the current GUI of the television is complex and the current GUI of the television includes a large number of and/or a great variety of widgets, to assist the user to perform intuitional and visual remote control on the mobile terminal, alternatively, an interface thumbnail of the current GUI of the television may be generated according to a control interface resolution that can be negotiated by the television and the mobile terminal in the wireless connection process, and the interface thumbnail is sent to the mobile terminal. If the interface thumbnail is large, the interface thumbnail may be partitioned, compressed, and sent to the mobile terminal, so as to be convenient for the mobile terminal to browse.

Figure 3:
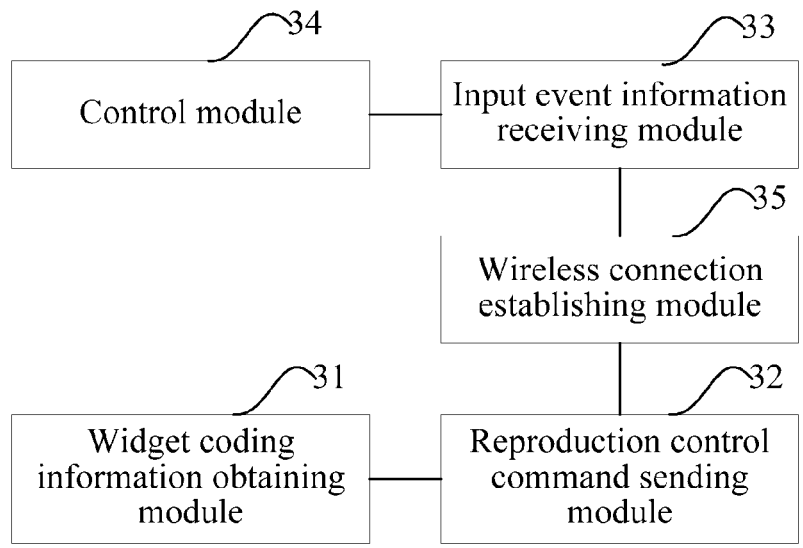
FIG. 3 is a schematic structural diagram of an apparatus for a mobile terminal to remotely control a television provided by Embodiment 3 of the present invention.

FIG. 3 is a schematic structural diagram of an apparatus for a mobile terminal to remotely control a television provided by Embodiment 3 of the present invention. The apparatus provided by this embodiment is configured to implement the method shown in FIG. 1, and includes: a widget coding information obtaining module Si, a reproduction control command sending module 32, an input event information receiving module 33, and a control module 34.

The widget coding information Obtaining module 31 may be configured to obtain widget coding information of a widget included in a current GUI of a television.

The reproduction control command sending module 32 may be configured to send a graph reproduction control command to a mobile terminal wirelessly connected to the television, where the graph reproduction control command includes the widget coding information used for instructing the mobile terminal to generate a control interface including a widget corresponding to the widget coding information.

The input event information receiving module 33 may be configured to receive input event information sent by the mobile terminal, where the input event information includes operation object information and operation instruction information that are captured by the mobile terminal in the control interface.

The control module 34 may be configured to determine a target widget in the current GUI of the television according to the operation object information and perform, on the target widget, an operation corresponding to the operation instruction information.

Based on the above technical solution, the apparatus may also include: a wireless connection establishing module 35.

The wireless connection establishing module 35 may be configured to establish a wireless connection between the television and the mobile terminal, and negotiate, in a process of establishing the wireless connection, a coordinate transformation relationship and an operation instruction coding correspondence between the television and the terminal, and/or a control interface resolution.

The input event information is screen touch input event information, the operation object information is coordinate information related to a touch operation, and the operation instruction information is touch operation instruction information. Correspondingly, the control module 34 is specifically configured to perform, according to the coordinate transformation relationship, coordinate transformation on the coordinate information related to a touch operation, and determine the target widget according to a coordinate transformation result; and according to the operation instruction coding correspondence, determine television operation instruction information corresponding to the touch operation instruction information, and perform, on the target widget, an operation corresponding to the television operation instruction information.

In the apparatus provided by this embodiment, by establishing a wireless connection between the television and the mobile terminal, the widget coding information of the widget included in the current GUI of the television is sent to the mobile terminal, so as to reproduce, on the mobile terminal, the control interface including the corresponding widget. The input event information captured by the mobile terminal in the control interface is obtained. Based on the input event information, the controlling and corresponding operation is performed on a corresponding target of the current GUI of the television. Therefore, long-distance control of a complex television GUI implemented by the mobile terminal may be supported, thereby implementing long-distance control of the television by the mobile terminal with a low cost. A device entity of the apparatus provided by this embodiment may be a visual remote server (Visual Remote Service, VRS tier short), a set top box, and a digital television integrated with functions of a set top box, and for a working mechanism of the device entity, reference may be made to a corresponding record of the embodiment in FIG. 1, which is not described here again.

Figure 4:
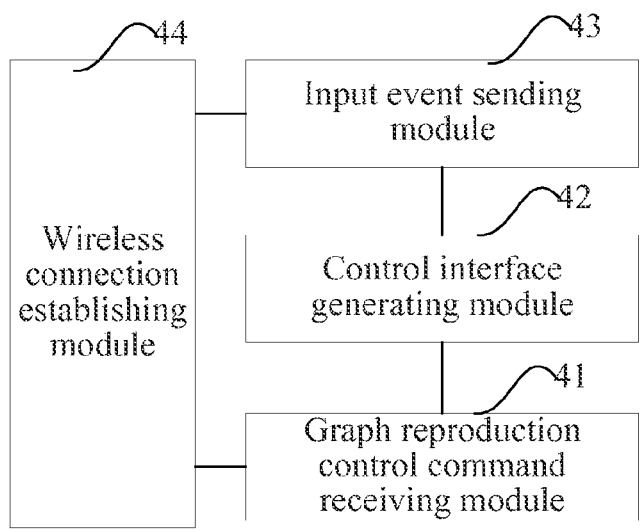
FIG. 4 is a schematic structural diagram of an apparatus for a mobile terminal to remotely control a television provided by Embodiment 4 of the present invention.

FIG. 4 is a schematic structural diagram of an apparatus for a mobile terminal to remotely control a television provided by Embodiment 4 of the present invention. The apparatus provided by this embodiment may be configured to implement the method shown in FIG. 2, and includes: a graph reproduction control command receiving module 41, a control interface generating module 42, and an input event sending module 43.

The graph reproduction control command receiving module 41 may be configured to receive a graph reproduction control command sent by a television wirelessly connected to a mobile terminal, where the graph reproduction control command includes widget coding information of a widget included in a current GUI of the television.

The control interface generating module 42 may be configured to generate, according to an API interface function used for widget management in a local GUI system of the mobile terminal, a control interface including a widget corresponding to the widget coding information.

The input event sending module 43 may be configured to: when an input event for the control interface is captured, send, to the television, corresponding input event information used for instructing the television to perform, on the current GUI of the television, processing corresponding to the input event information, where the input event information includes operation object information and operation instruction information. For example, the input event information is screen touch input event information, the operation object information is coordinate information related to a touch operation, and the operation instruction information is touch operation instruction information.

Based on the above technical solution, the apparatus may also include: a wireless connection establishing module 44.

The wireless connection establishing module 44 may be configured to establish a wireless connection between the television and the mobile terminal, and negotiate a coordinate transformation relationship and an operation instruction coding correspondence between the television and the terminal, and/or a control interface resolution in a process of establishing the wireless connection.

In the apparatus provided by this embodiment, by establishing a wireless connection between the television and the mobile terminal, the mobile terminal receives the widget coding information of the widget included in the current GUI of the television, and reproduces the control interface including the corresponding widget by using the local GUI system of the mobile terminal. When a user triggers an input event in the control interface, the mobile terminal may send the input event information to the television, so that the television correspondingly processes the current GUI of the television based on the input event information. Therefore, long-distance control of a complex television GUI implemented by the mobile terminal may be supported, thereby implementing tong-distance control of the television by the mobile terminal with a low cost. A device entity of the apparatus provided by this embodiment the apparatus provided by this embodiment may be a visual remote agent (Visual Remote Agent, VRA for short) and a smart terminal, and for a working mechanism of the device entity, reference may be made to a corresponding record of the embodiment in FIG. 2, which is not described here again.

Figure 5:
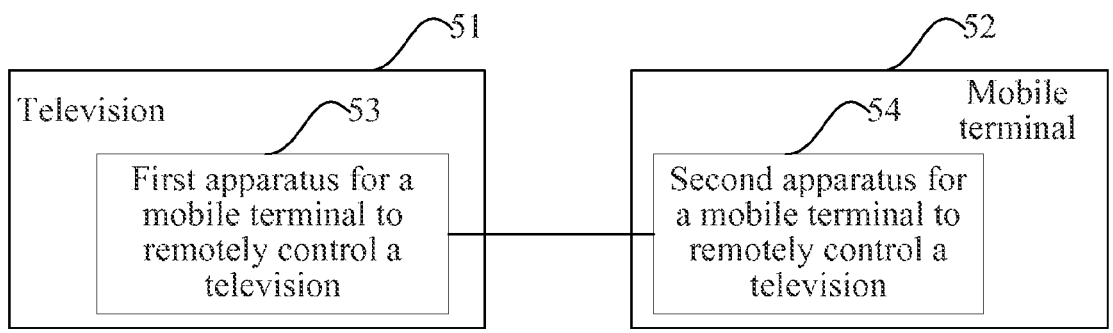
FIG. 5 is a schematic structural diagram of a system for a mobile terminal to remotely control a television provided by Embodiment 5 of the present invention.

FIG. 5 is a schematic structural diagram of a system for a mobile terminal to remotely control a television provided by Embodiment 5 of the present invention. The system provided by this embodiment includes: a television 51, a mobile terminal 52, a first apparatus for a mobile terminal to remotely control a television 53, and a second apparatus for a mobile terminal to remotely control a television 54. The first apparatus for a mobile terminal to remotely control a television 53 is the apparatus for a mobile terminal to remotely control a television shown in FIG. 3. The first apparatus for a mobile terminal to remotely control a television 53 may be arranged by integrating with the television 51 (as shown in FIG. 5), or may be arranged separated from the television and be connected to the television. The second apparatus for a mobile terminal to remotely control a television 54 is the apparatus for a mobile terminal to remotely control a television shown in FIG. 4. The second apparatus for a mobile terminal to remotely control a television 54 is wirelessly connected to the first apparatus for a mobile terminal to remotely control a television 51 and is arranged by integrating with the mobile terminal 52 (as shown in FIG. 5), or is arranged separated from the mobile terminal 52 and is connected to the mobile terminal 52. The first apparatus for a mobile terminal to remotely control a television 53 may also be called a VRS, and the second apparatus for a mobile terminal to remotely control a television 54 may also be called a VRA. A communication protocol between the VRS and the VRA may be called a visual remote transfer protocol (Visual Remote Transfer Protocol, VRTP for short).

In the system provided by this embodiment, by establishing a wireless connection between the television and the mobile terminal, the mobile terminal receives the widget coding information of the widget included in the current GUI of the television, and reproduces the control interface including the corresponding widget by using the local GUI system of the mobile terminal. When a user triggers an input event in the control interface, the mobile terminal may send the input event information to the television, so that the television correspondingly processes the current GUI of the television based on the input event information. Therefore, long-distance control of a complex television GUI implemented by the mobile terminal may be supported, thereby implementing long-distance control of the television by the mobile terminal with a low cost. For each apparatus related to the system, working mechanisms of each apparatus, and the method for interaction between different apparatuses, reference may be made to corresponding records of the above embodiments, which is not described here again.

It should be understood that the system, the apparatus and the method disclosed by the present invention may be implemented in other manners. For example, the above described apparatus embodiment is merely exemplary. For example, division of the modules is merely division of logical functions, and practical implementation may involve other division manners. For example, a plurality of modules may be combined or integrated into another system, or some features may be ignored or may not be executed. Furthermore, mutual connection between the shown or discussed modules or apparatuses may be implemented through some physical or logical interfaces, and the connection may be in an electrical or mechanical form or in other forms.

The described apparatus embodiment is merely exemplary. The units described as separate parts may or may not be physically separate, and parts displayed as modules may or may not be physical units, may be located in one position, or may be distributed on at least two network elements. A part of or all of the modules may be selected according to the actual need to achieve the objectives of the solutions of the embodiments. Persons skilled in the art may understand and implement the embodiments without creative efforts.

Finally, it should be noted that the above embodiments of the present invention are merely intended for describing the technical solutions of the present invention other than limiting the present invention. Although the present invention is described in detail with reference to the foregoing embodiments, persons skilled in the art should understand that they may still make modifications to the technical solution described in the foregoing embodiments or make equivalent substitutions to some technical features thereof, without departing from the spirit and scope of the technical solution of the embodiments of the present invention.

What is claimed is:

1. A method for a mobile terminal wirelessly connected to a television to remotely control the television, the method comprising:
   negotiating a coordinate transformation relationship between the television and the mobile terminal and an operation instruction correspondence between the television and the mobile terminal;
   parsing a current Graphic User Interface (GUI) of the television to determine one or more interactive elements included in the current GUI and one or more non-interactive elements included in the current GUI and to distinguish the one or more interactive elements included in the current GUI from the one or more non-interactive elements included in the current GUI;
   obtaining, for each of the one or more interactive elements included in the GUI, widget coding information, the widget coding information including a widget type of a corresponding interactive element, the widget type corresponding to an application programming interface (API) function of the mobile terminal;
   sending a graph reproduction control command to the mobile terminal, wherein the graph reproduction control command comprises:
      the widget coding information for each of the one or more interactive elements included in the GUI,
      a direction to determine the API function corresponding to the widget type of each of the one or more interactive elements included in the GUI and to execute each determined API function so as to obtain a control interface the control interface being a mobile terminal GUI;
   receiving input event information sent by the mobile terminal, wherein the input event information comprises operation object information and operation instruction information that are captured by the mobile terminal in the control interface; and
   determining a target interactive element in the GUI of the television according to the operation object information, and performing, on the target widget, an operation corresponding to the operation instruction information.

2. The method according to claim 1, wherein before obtaining, for each of the one or more interactive elements included in the GUI, the widget coding information, the method further comprises:
   establishing a wireless connection between the television and the mobile terminal, and negotiating, in a process of establishing the wireless connection, a resolution of the control interface.

3. The method according to claim 1, wherein
   the input event information is screen touch input event information, the operation object information is coordinate information related to a touch operation, and the operation instruction information is touch operation instruction information;
   wherein determining the target interactive element in the current GUI of the television according to the operation object information comprises: performing, according to the coordinate transformation relationship, coordinate transformation on the coordinate information related to the touch operation, and determining the target widget interactive element according to a coordinate transformation result; and
   the performing the operation corresponding to the operation instruction information on the target interactive element comprises: determining, according to the operation instruction coding correspondence, television operation instruction information corresponding to the touch operation instruction information, and performing, on the target interactive element, an operation corresponding to the television operation instruction information.

4. A method for a mobile terminal wirelessly connected to a television to remotely control the television, the method comprising:
   negotiating a coordinate transformation relationship between the television and the mobile terminal and an operation instruction correspondence between the television and the mobile terminal;
   receiving a graph reproduction control command sent by the television wirelessly connected to the mobile terminal, wherein the graph reproduction control command comprises:
      widget coding information for each of one or more interactive elements included in a current Graphic User Interface (GUI) of the television, the widget coding information including a widget type of a corresponding interactive element;

determining an application programming interface (API) function of the mobile terminal corresponding to each widget type included in the widget coding information;

executing each determined API function so as to produce a control interface comprising:

for each of the one or more interactive elements included in the current GUI, a widget corresponding to the widget coding information included in the graph reproduction control command; and when an input event for the control interface is captured, sending, to the television, corresponding input event information used for instructing the television to perform, on the current GUI of the television, processing corresponding to the input event information, wherein the input event information comprises operation object information and operation instruction information.

5. The method according to claim 4, wherein before receiving the graph reproduction control command, the method further comprises:

establishing a wireless connection between the television and the mobile terminal, and negotiating, in a process of establishing the wireless connection, a resolution of the control interface.

6. The method according to claim 5, wherein the input event information is screen touch input event information, the operation object information is coordinate information related to a touch operation, and the operation instruction information is touch operation instruction information.

7. An apparatus for a mobile terminal wirelessly connected to a television to remotely control the television, the apparatus comprising:

a Graphic User Interface (GUI) parsing module, configured to determine one or more interactive elements included in the current GUI and one or more non-interactive elements included in the current GUI and to distinguish the one or more interactive elements included in the current GUI from the one or more non-interactive elements included in the current GUI;

a widget coding information obtaining module, configured to obtain, for each of one or more interactive elements included in the current GUI, widget coding information, the widget coding information including a widget type of a corresponding interactive element, the widget type corresponding to an application programming interface (API) function of the mobile terminal;

a wireless connection establishing module, configured to establish a wireless connection between the television and the mobile terminal and negotiate, in a process of establishing the wireless connection, a coordinate transformation relationship between the television and the mobile terminal and an operation instruction coding correspondence between the television and the mobile terminal;

a reproduction control command sending module, configured to send a graph reproduction control command to the mobile terminal wirelessly connected to the television, wherein the graph reproduction control command comprises:

the widget coding information for each of the one or more interactive elements included in the GUI, a direction to determine an application programming interface (API) function corresponding to the widget type of each of the one or more interactive elements included in the GUI and to execute each determined API function so as to obtain a control interface the control interface being a mobile terminal GUI;

an input event information receiving module, configured to receive input event information sent by the mobile terminal, wherein the input event information comprises operation object information and operation instruction information that are captured by the mobile terminal in the control interface; and a control module, configured to determine a target interactive element in the current GUI of the television according to the operation object information and perform, on the target interactive element, an operation corresponding to the operation instruction information.

8. The apparatus according to claim 7, wherein the wireless connection establishing module is further configured to negotiate, in the process of establishing the wireless connection, a resolution of the control interface.

9. The apparatus according to claim 8, wherein the input event information is screen touch input event information, the operation object information is coordinate information related to a touch operation, and the operation instruction information is touch operation instruction information; and the control module is configured to perform, according to the coordinate transformation relationship, coordinate transformation on the coordinate information related to the touch operation, and determine the target interactive element according to a coordinate transformation result; and determine, according to the operation instruction coding correspondence, television operation instruction information corresponding to the touch operation instruction information, and perform, on the target interactive element, an operation corresponding to the television operation instruction information.

10. An apparatus for a mobile terminal to remotely control a television, comprising:

a wireless connection establishing module, configured to establish a wireless connection between the television and the mobile terminal and negotiate, in a process of establishing the wireless connection, a coordinate transformation relationship between the television and the mobile terminal and an operation instruction coding correspondence between the television and the terminal;

a graph reproduction control command receiving module, configured to receive a graph reproduction control command sent by the television wirelessly connected to the mobile terminal, wherein the graph reproduction control command comprises:

widget coding information for each of one or more interactive elements included in a current Graphic User Interface (GUI) of the television, the widget coding information including a widget type of a corresponding interactive element;

a control interface generating module, configured to:

determine an application programming interface (API) function of the mobile terminal corresponding to each widget type included in the widget coding information;

execute each determined API function so as to produce a control interface comprising, for each of the one or more interactive elements included in the current GUI, a widget corresponding to the widget coding information included in the graph reproduction control command; and an input event sending module, configured to: when an input event for the control interface is captured, send, to the television, corresponding input event information used for instructing the television to perform, on the current GUI of the television, processing corresponding to the input event information, wherein the input event information comprises operation object information and operation instruction information.

11. The apparatus according to claim 10, wherein the wireless connection establishing module is further configured to negotiate, in the process of establishing the wireless connection, a resolution of the control interface.

12. The apparatus according to claim 10, wherein the input event information is screen touch input event information, the operation object information is coordinate information related to a touch operation, and the operation instruction information is touch operation instruction information.

13. A system for a mobile terminal to remotely control a television, comprising:
the television;
the mobile terminal;
a first apparatus for the mobile terminal to remotely control the television; and
a second apparatus for the mobile terminal to remotely control the television;
wherein the first apparatus comprises:
a Graphic User Interface (GUI) parsing module configured to determine one or more interactive elements included in the current GUI and one or more non-interactive elements included in the current GUI and to distinguish the one or more interactive elements included in the current GUI from the one or more non-interactive elements included in the current GUI;
a wireless connection establishing module, configured to establish a wireless connection between the television and the mobile terminal and negotiate, in a process of establishing the wireless connection, a coordinate transformation relationship between the television and the mobile terminal and an operation instruction coding correspondence between the television and the mobile terminal;
a widget coding information obtaining module, configured to obtain, for each of one or more interactive elements included in the current GUI, widget coding information, the widget coding information including a widget type of a corresponding interactive element, the widget type corresponding to an application programming interface (API) function of the mobile terminal;
a reproduction control command sending module, configured to send a graph reproduction control command to the mobile terminal wirelessly connected to the television, wherein the graph reproduction control command comprises:
the widget coding information for each of the one or more interactive elements included in the GUI,
a direction to determine an application programming interface (API) function corresponding to the widget type of each of the one or more interactive elements included in the GUI and to execute each determined API function so as to obtain a control interface, the control interface being a mobile terminal GUI;
an input event information receiving module, configured to receive input event information sent by the mobile terminal, wherein the input event information comprises operation object information and operation instruction information that are captured by the mobile terminal in the control interface; and
a control module, configured to determine a target interactive element in the current GUI of the television according to the operation object information and perform, on the target interactive element, an operation corresponding to the operation instruction information
wherein the second apparatus comprises:
a graph reproduction control command receiving module, configured to receive a graph reproduction control command sent by the television wirelessly connected to the mobile terminal, wherein the graph reproduction control command comprises:
widget coding information for each of one or more interactive elements included in a current Graphic User Interface (GUI) of the television the widget coding information including a widget type of a corresponding interactive element;
a control interface generating module, configured to:
determine an application programming interface (API) function of the mobile terminal corresponding to each widget type included in the widget coding information;
execute each determined API function so as to produce a control interface comprising for each of the one or more interactive elements included in the current GUI, a widget corresponding to the widget coding information included in the graph reproduction control command; and
an input event sending module, configured to: when an input event for the control interface is captured, send, to the television, corresponding input event information used for instructing the television to perform, on the current GUI of the television, processing corresponding to the input event information, wherein the input event information comprises operation object information and operation instruction information;
wherein the second apparatus is wirelessly connected to the first apparatus and is configured to integrate with the mobile terminal.

14. The system according to claim 13, wherein the first apparatus is arranged separated from the television and is connected to the television.

15. The system according to claim 13, wherein the second apparatus is arranged separated from the mobile terminal and is connected to the mobile terminal.

16. The method of claim 2, further comprising:
generating, according to the resolution of the control interface, an interface thumbnail of the current GUI of the television; and
sending the interface thumbnail to the mobile terminal.

17. The method of claim 16, further comprising:
prior to sending the interface thumbnail to the mobile terminal, partitioning and compressing the interface thumbnail;
wherein sending the interface thumbnail to the mobile terminal comprises sending the partitioned and compressed interface thumbnail to the mobile terminal.

18. The method of claim 5, further comprising:
receiving an interface thumbnail of the current GUI of the television;
wherein the interface thumbnail was generated according to the resolution of the control interface.

19. The method of claim 18, wherein the interface thumbnail is partitioned and compressed.

20. The method of claim 16, wherein generating, according to the resolution of the control interface, an interface thumbnail of the current GUI of the television is performed in response to determining one of the group consisting of:

a number of interactive elements in the current GUI of the television exceeds a threshold number, and
a variety of interactive elements in the current GUI of the television exceeds a threshold variety.

* * * * *